(12) United States Patent
Lu et al.

(10) Patent No.: US 11,369,906 B2
(45) Date of Patent: Jun. 28, 2022

(54) VORTEX SEPARATION DEVICE

(71) Applicant: China University of Petroleum-Beijing, Beijing (CN)

(72) Inventors: Chunxi Lu, Beijing (CN); Wen Zhou, Beijing (CN); Chenglin E, Beijing (CN); Zixuan Li, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 43 days.

(21) Appl. No.: 17/091,160

(22) Filed: Nov. 6, 2020

(65) Prior Publication Data

US 2021/0170318 A1  Jun. 10, 2021

(30) Foreign Application Priority Data

Dec. 5, 2019 (CN) .......................... 201911233004.3

(51) Int. Cl.
*B01D 45/12* (2006.01)
*B01D 45/16* (2006.01)
*B01D 45/08* (2006.01)
*B01D 45/02* (2006.01)
*B01D 45/06* (2006.01)
*B01D 19/00* (2006.01)
*B01D 53/24* (2006.01)
*B01D 53/26* (2006.01)

(52) U.S. Cl.
CPC ............. *B01D 45/16* (2013.01); *B01D 45/02* (2013.01); *B01D 45/06* (2013.01); *B01D 45/08* (2013.01); *B01D 19/0057* (2013.01); *B01D 53/24* (2013.01); *B01D 53/26* (2013.01)

(58) Field of Classification Search
CPC .... B01D 45/16; B01D 45/08; B01D 19/0057; B01D 45/02; B01D 45/06; B01D 53/24; B01D 53/26
See application file for complete search history.

(56) References Cited

U.S. PATENT DOCUMENTS 2,535,140 A * 12/1950 Kassel .................... B01J 8/0055
96/372
4,397,738 A * 8/1983 Kemp .................... C10G 11/18
422/144

(Continued)

FOREIGN PATENT DOCUMENTS

CN          102533311 A        7/2012

*Primary Examiner* — Dung H Bui
(74) *Attorney, Agent, or Firm* — Westbridge IP LLC

(57) ABSTRACT

A gas-liquid separation device comprises: an outer housing extending vertically, which is provided with a gas outlet at an upper end of the outer housing and a liquid outlet at a lower end of the outer housing; an inner housing disposed in the outer housing and extending vertically, an upper end of the inner housing being coupled to the outer housing in a sealed manner, a lower end of the inner housing being opened, with an annular space formed between the outer housing and the inner housing; a feeding tube inserted into the outer housing and communicated with the inner housing, with a cyclone mechanism between the feeding tube and the inner housing to output fluid into the inner housing as a swirling flow. The present disclosure can reduce the disturbance of the downward gas flow and the upward gas flow in the separation space, thus improving the separation efficiency.

20 Claims, 7 Drawing Sheets

(56) References Cited

U.S. PATENT DOCUMENTS

| | | | | |
|---|---|---|---|---|
| 4,482,451 A * | 11/1984 | Kemp | C10G 11/18 | 422/144 |
| 6,063,263 A * | 5/2000 | Palmas | B01J 8/006 | 208/113 |
| 7,488,361 B2 * | 2/2009 | Larnholm | B01D 50/20 | 55/318 |
| 8,110,024 B2 * | 2/2012 | Folkvang | B01D 19/0057 | 96/182 |
| 2004/0211734 A1 * | 10/2004 | Moya | B01D 21/0036 | 210/512.1 |
| 2005/0011170 A1 * | 1/2005 | Christiansen | B04C 5/103 | 55/345 |
| 2005/0060970 A1 * | 3/2005 | Polderman | B01D 45/08 | 55/320 |
| 2008/0177019 A1 * | 7/2008 | Salmon | B01D 45/16 | 210/512.1 |
| 2008/0257147 A1 * | 10/2008 | Gregory | B01J 8/0278 | 96/6 |
| 2010/0043365 A1 * | 2/2010 | Fujiyama | B04C 5/12 | 55/426 |
| 2013/0247764 A1 * | 9/2013 | Kvamsdal | B01D 19/0057 | 96/208 |
| 2014/0150654 A1 * | 6/2014 | Llamas | B01J 8/0055 | 95/271 |
| 2016/0016110 A1 * | 1/2016 | Muñoz Segura | B01D 53/266 | 122/492 |
| 2017/0056799 A1 * | 3/2017 | Palmas | B04C 5/04 | |
| 2018/0221800 A1 * | 8/2018 | Konijn | B01D 45/16 | |
| 2019/0151766 A1 * | 5/2019 | Salazar | B01D 3/008 | |
| 2019/0321833 A1 * | 10/2019 | Lu | B04C 3/06 | |
| 2020/0001309 A1 * | 1/2020 | Kvamsdal | B04C 5/14 | |
| 2021/0039035 A1 * | 2/2021 | Winter | B01D 45/18 | |
| 2021/0170318 A1 * | 6/2021 | Lu | B01D 45/06 | |
| 2021/0371371 A1 * | 12/2021 | Xu | B01J 8/34 | |

\* cited by examiner

VORTEX SEPARATION DEVICE

CROSS-REFERENCE TO RELATED APPLICATIONS

This application claims priority to Chinese Patent Application No. 201911233004.3, filed on Dec. 5, 2019, which is hereby incorporated by reference in its entirety.

TECHNICAL FIELD

The present disclosure relates to the technical field of chemical separation devices, and particularly to a gas-liquid separation device.

BACKGROUND

The gas-liquid separation device is widely used in the energy and chemical industries, mainly for the natural gas transportation and purification, the deep-sea oil-gas-water separation, the distillation tower/scrubber demisting separation and the reaction product separation, etc. According to different application backgrounds, the structure and principle of the gas-liquid separation device are generally varied. At present, there are many separation devices adopting the principle of centrifugal separation, because the centrifugal force can reach dozens of times of gravity or even more. Thus, the centrifugal separation has a higher efficiency than the gravity separation. Moreover, the centrifugal separator has the advantages of high separation efficiency, small device volume and footprint, easy installation, flexible operation, stable and continuous operation, no wearing parts, easy maintenance and so on.

SUMMARY

The existing gas-liquid cyclone separators based on the principle of centrifugal separation mostly adopt the tangential and 'reverse' flow mode, in which improvements are only made to an inlet structure for a gas-liquid mixture to enter a separator to achieve innovation in the structure of the gas-liquid separator. FIG. 1 is a schematic diagram showing structure of a tangential-flow and reverse type cyclone separator in the existing technology. As illustrated in FIG. 1, a gas flow enters a separation device tangentially through an inlet of a cyclone separator to form a double-vortex flow inside the cyclone separator, with an outer vortex mainly swirling downward in the vicinity of a cylinder wall, and an inner vortex swirling upward in a central area of the cylinder. Droplets are separated from a gas-phase fluid under the centrifugal force, coalesce after moving to a sidewall, and flow downward to a liquid outlet along the sidewall so as to exit the separator. The purified gas enters the inner vortex along a radial direction or reversely, and finally exits the device through a gas outlet core tube at top of the separator, thus completing the gas-liquid two-phase separation.

In another example, Chinese patent publication No. CN102533311A discloses an axial-flow ultrashort contact cyclone reactor. FIG. 2 is a schematic diagram showing structure of the axial-flow ultrashort contact cyclone reactor in the existing technology, which illustrates an axial-flow and reverse type separator with a spiral guide vane structure. After entering the separator axially, the gas-liquid two-phase mixture can swirl tangentially through the guide vane, and this flow mode provides the centrifugal force needed for the gas-liquid two-phase separation. The flow mode of the gas flow in the separation space is the same as that in the tangential-flow and reverse type cyclone separator, i.e., the gas flow completes a 'reverse' movement in the separation space.

The applicant finds that in the practical applications of the existing tangential-flow and reverse type cyclone separator as well as the axial-flow type cyclone separator described above, it is difficult for a single separation device to meet the requirement of large treatment capacity while maintaining a good separation efficiency, and the gas flow will have a 'reverse' flow in the separation space, thus the downward gas flow and the upward gas flow will be disturbed in the separation space, resulting in a strong gas flow turbulence and severe short-circuit flow, which cause some tiny droplets to be sucked into the upward gas flow and discharged from the separation device by entrainment, thereby reducing the separation efficiency. When the gas velocity is too high, the droplets will be sheared and broken into smaller droplets by the gas, so that the entrainment phenomenon is very severe in the reverse flow process, which is extremely unfavorable to the separation efficiency. Furthermore, in order to meet the requirement of large treatment capacity, a plurality of separation devices are usually connected in parallel during operation. However, after the plurality of separation devices are connected in parallel, there are the problems of the uneven distribution of the inlet gas and the obvious gas channeling among the separation devices, which significantly reduce the separation efficiency after the parallel connection.

In order to overcome the above defects in the existing technology, the technical problem to be solved by the embodiments of the present disclosure is to provide a gas-liquid separation device capable of reducing the disturbances of the downward gas flow and the upward gas flow in the separation space, thus improving the separation efficiency.

The technical solutions provided in the embodiments of the present disclosure are as follows.

A gas-liquid separation device, comprising:

an outer housing extending vertically, which is provided with a gas outlet at an upper end of the outer housing and a liquid outlet at a lower end of the outer housing;

an inner housing disposed in the outer housing and extending vertically, an upper end of the inner housing being coupled to the outer housing in a sealed manner, a lower end of the inner housing being provided with an opening, with an annular space formed between the outer housing and the inner housing; and a feeding tube inserted into the outer housing and communicated with the inner housing, with a cyclone mechanism between the feeding tube and the inner housing to output fluid in the feeding tube into the inner housing as a swirling flow.

Preferably, the feeding tube is inserted into the inner housing from above the outer housing, a lower end of the feeding tube is closed, and the cyclone mechanism is located on a sidewall of the feeding tube.

Preferably, a cross-section of the outer housing is circular, a cross-section of the inner housing is circular, a ratio of a diameter of the inner housing to a diameter of the outer housing is between 0.5 and 0.8, a ratio of a length of the outer housing to the diameter of the outer housing is between 1 and 3, and a ratio of a length of the inner housing to the diameter of the inner housing is between 1 and 3.

Preferably, the gas-liquid separation device further comprises a grille disposed in the outer housing and located below the inner housing, wherein the grille is cone-shaped with an apex facing the inner housing; and when the gas-liquid separation device separates gas and liquid, the outer housing has a predefined liquid level lower than the grille.

Preferably, the fluid output from the cyclone mechanism swirls in a first direction; and a sidewall of the lower end of the inner housing is provided with a slot horizontally extending in a second direction opposite to the first direction.

Preferably, the lower end of the inner housing is provided with a folded edge located at a circumferential periphery and extending inclinedly downward in a radial outward direction.

Preferably, the gas-liquid separation device further comprises an anti-impact baffle disposed in the outer housing, wherein the anti-impact baffle is cone-shaped with an apex facing the inner housing, and located directly below the inner housing; when the gas-liquid separation device separates gas and liquid, the outer housing has a predefined liquid level higher than a lower end face of the inner housing.

Preferably, the inner housing is tapered from top to bottom.

Preferably, there are a plurality of inner housings which are circumferentially distributed around the feeding tube; the feeding tube is inserted into the outer housing from above, and the fluid output from the feeding tube flows into the inner housings tangentially.

Preferably, there are a plurality of inner housings, the feeding tube is inserted into the outer housing from above, the upper ends of the inner housings are coupled to the feeding tube through a distributor, and a spiral guide vane mechanism is disposed between each of the inner housings and the distributor for guiding fluid output from the distributor into the inner housings as a swirling flow.

The technical solutions of the present disclosure have the following advantages.

1. In the separation method provided by the present application, there is no disturbance by the upward reverse movement of the gas flow in the annular space, so the turbulence of the gas flow in the inner housing can be effectively reduced, which is beneficial to the coalescence and separation of the droplets. In the inner housing, even if the excessively high gas velocity causes some droplets to break, the droplets will still be discharged from a discharge port at the lower end without being entrained in the upward gas flow. Due to the surface tension, the liquid has a special property, that is, after being merged into the liquid stream, it is difficult for the tiny droplets to be separated therefrom. With this property, the liquid stream that has been separated out by centrifugation can absorb most of the tiny droplets in the vicinity of the outlet at the lower end of the inner housing. Before the fluid enters the annular space, most of the liquid has been separated out, and a small amount of entrained liquid can also undergo a secondary separation in the annular space, thus finally achieving an excellent separation effect. Moreover, the gas-liquid separation device in present disclosure is of a simple structure without any mechanical component, a long service life, and easy installation and maintenance. Compared with other gas-liquid separation devices which can achieve the same purpose, the present disclosure has advantages in structure and operation simplicity.

2. Since the gas flow in the annular space is not disturbed by the downward reverse movement in the inner housing, tangential velocities of the gas and liquid can be increased, thus increasing the centrifugal force and further improving the separation efficiency. Meanwhile, the cross-sectional gas velocity can be greatly increased while maintaining a good separation efficiency, so as to improve the gas flow treatment capacity per unit time.

With reference to the following descriptions and drawings, specific embodiments of the present disclosure will be disclosed in detail to indicate the ways in which the principle of the present disclosure can be adopted. It should be understood that the scope of the embodiments of the present disclosure are not limited thereto. The embodiments of the present disclosure encompass many changes, modifications and equivalents within the spirit and clauses of the accompanied claims. The features described and/or illustrated with respect to one embodiment may be used in one or more other embodiments in the same or similar way, may be combined with the features in other embodiments, or may take place of those features.

BRIEF DESCRIPTION OF DRAWINGS

The drawings described herein are for illustration purposes only and are not intended to limit the scope of the present disclosure in any way. In addition, the shapes and dimensions of the elements in the drawings, which are presented to facilitate understanding of the present disclosure, are illustrative only and are not intended to limit the shapes and scales of the elements of the present disclosure. With the teaching of the present disclosure, those of ordinary skill in the art will be able to select appropriate shapes and dimensions to implement the present disclosure according to the particular circumstances.

Figure 1:
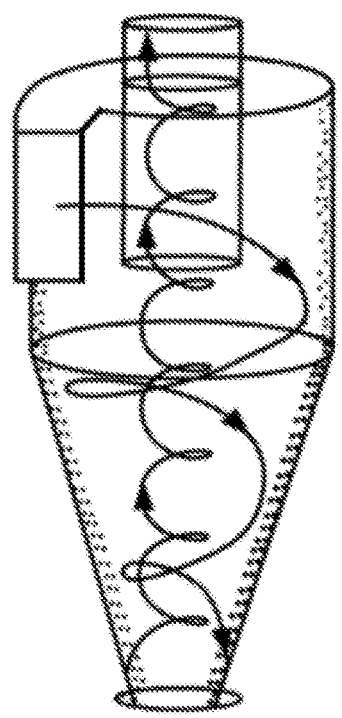
FIG. 1 is a schematic diagram showing structure of a tangential-flow and reverse type cyclone separator in the existing technology.
Figure 2:
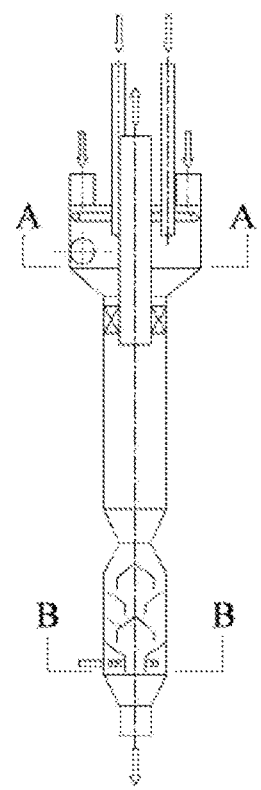
FIG. 2 is a schematic diagram showing structure of an axial-flow ultra-short contact cyclone reactor in the existing technology.

LIST OF REFERENCE NUMERALS 1 feeding tube
2 sealing plate
3 outer housing
4 cyclone mechanism 5 inner housing
6 grille
7 liquid outlet
8 predefined liquid level
9 opening
10 blocking plate
11 gas outlet
12 slot
13 folded edge
14 filling structure
15 anti-impact baffle
16 spiral guide vane mechanism
17 annular space
18 distributor

DESCRIPTION OF EMBODIMENTS

The details of the present disclosure can be more clearly understood from the accompanying drawings and the description of specific embodiments of the present disclosure. However, the specific embodiments of the present disclosure described herein are for illustrative purposes only and are not to be construed as limiting the present disclosure in any way. With the teaching of the present disclosure, those of ordinary skill can conceive of any possible variations of the present disclosure, which should be considered to be within the scope of the present disclosure. It should be noted that when an element is referred to as being 'disposed' on another element, it may be directly on another element or there may be an intermediate element. When an element is regarded as being 'connected' to another element, it may be directly connected to another element or there may be an intermediate element at the same time. The terms 'mounted', 'connected with' and 'connected to' should be understood in a broad sense. For example, a connection may be a mechanical connection or an electrical connection, or an internal communication between two elements, or a direct connection, or an indirect connection through an intermediate medium. For persons of ordinary skills in the art, the specific meanings of the above terms can be understood according to the specific conditions. The terms 'vertical', 'horizontal', 'upper', 'lower', 'left', 'right' and similar expressions used herein are for illustration purposes only rather than indicating a unique implementation.

Unless otherwise defined, all technical and scientific terms used herein have the same meanings as commonly understood by those skilled in the art of the present disclosure. The terms used in the description of the present disclosure are only for the purpose of describing the specific implementations, rather than limiting the present disclosure. The term "and/or" used herein includes any and all combinations of one or more of the related items listed.

Figure 3:
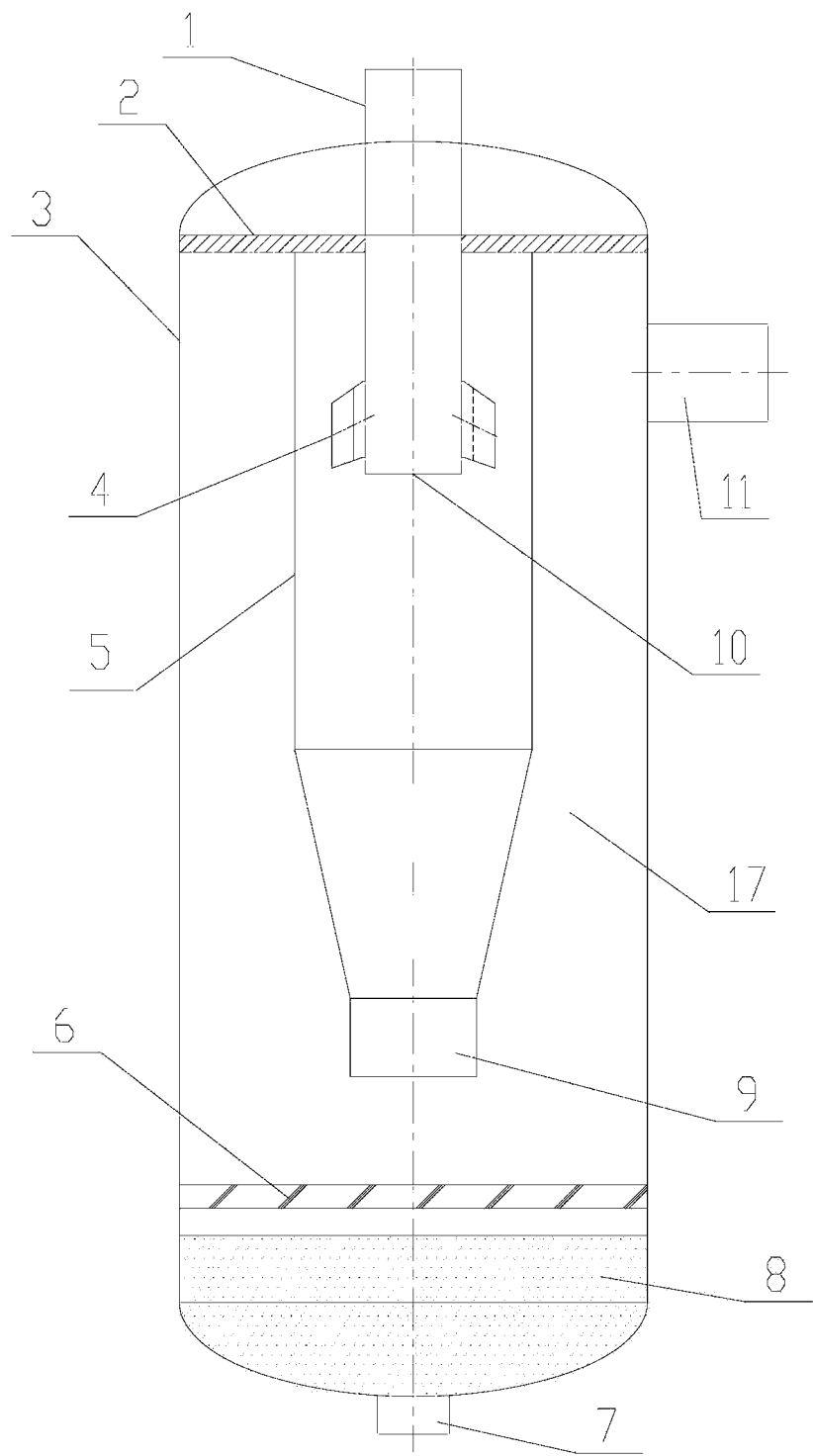
FIG. 3 is a schematic diagram showing structure of a gas-liquid separation device in a first implementation of the embodiments of the present disclosure.
Figure 4:
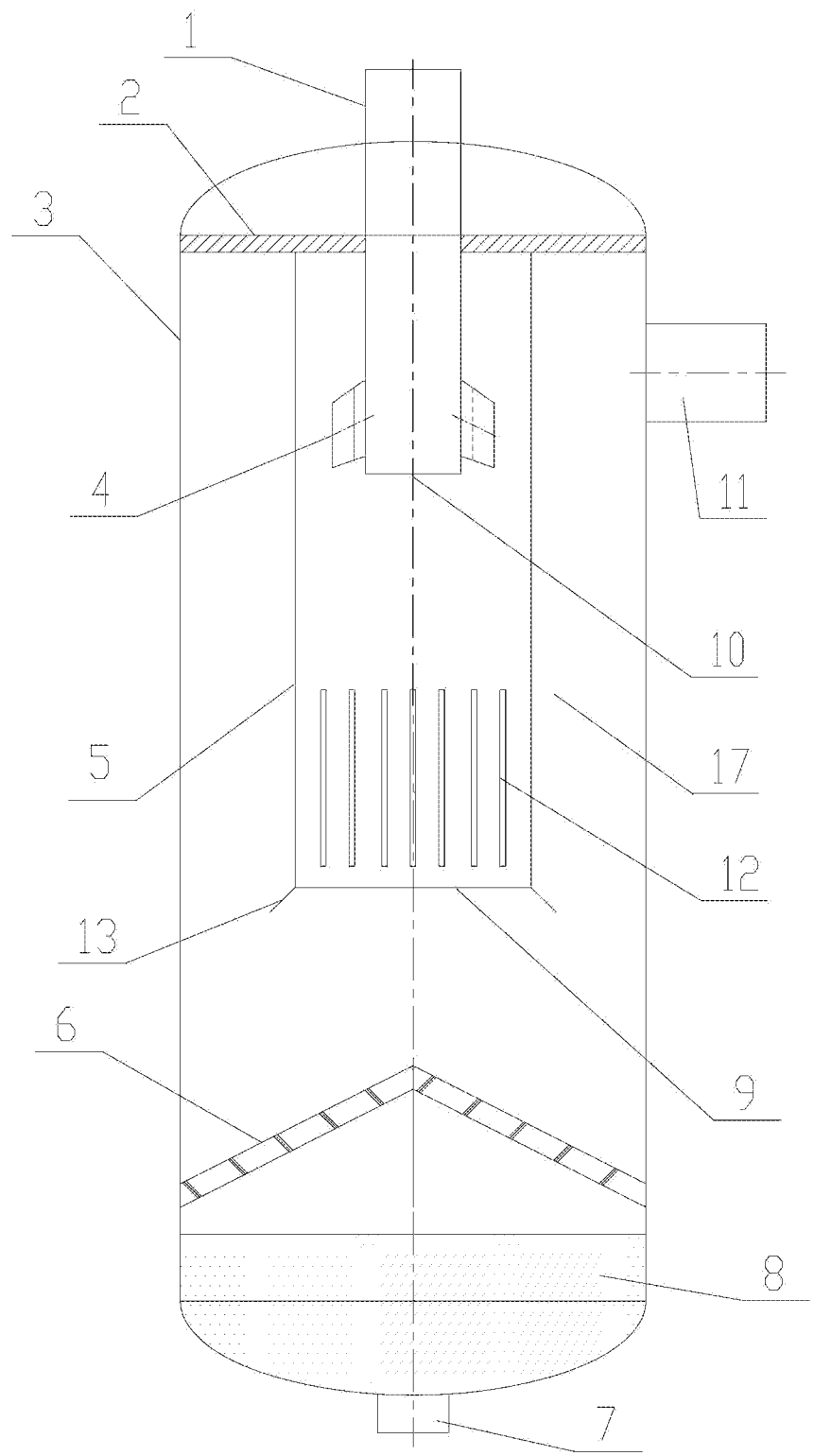
FIG. 4 is a schematic diagram showing structure of a gas-liquid separation device in a second implementation of the embodiments of the present disclosure.
Figure 5:
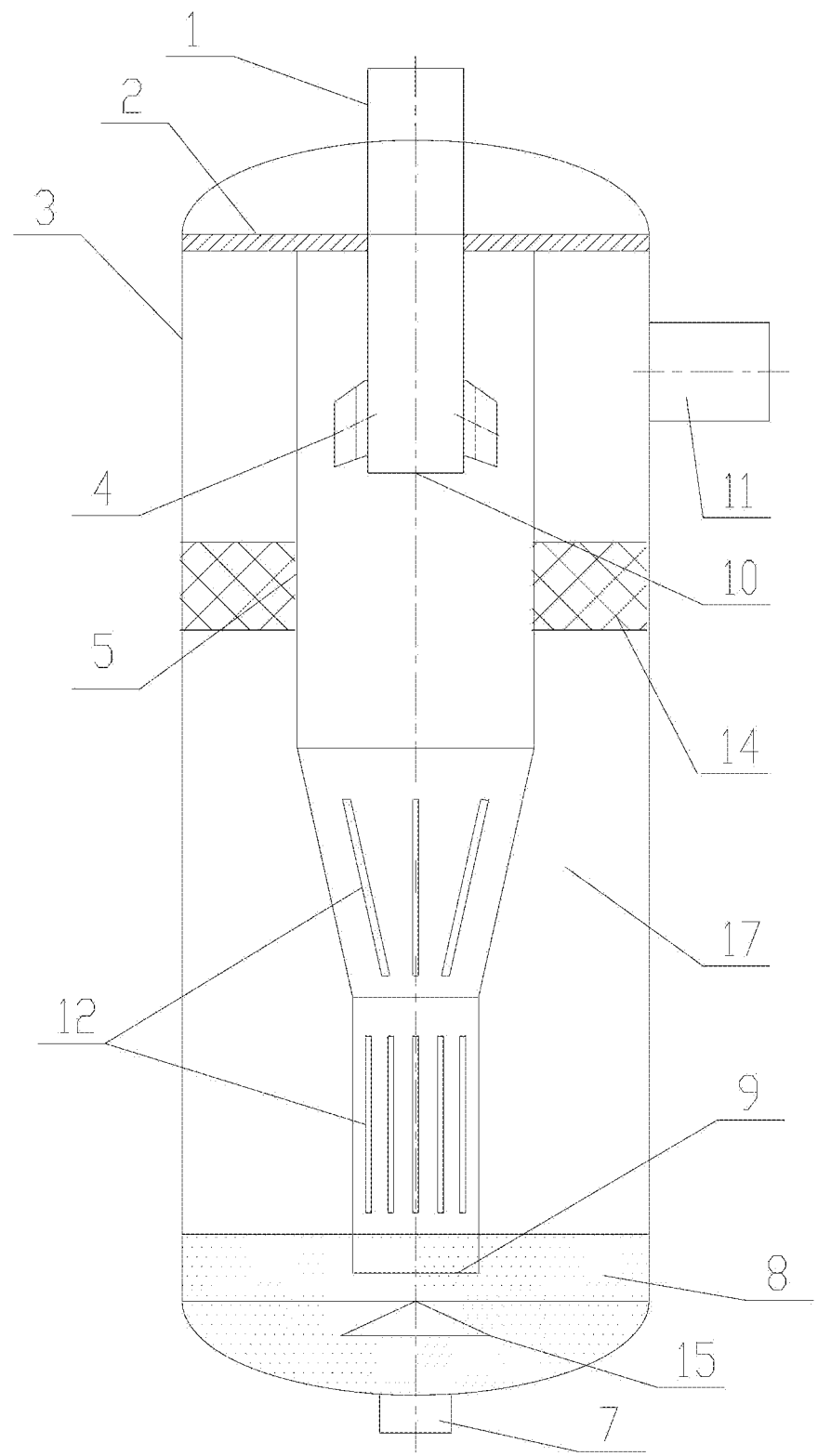
FIG. 5 is a schematic diagram showing structure of a gas-liquid separation device in a third implementation of the embodiments of the present disclosure.
Figure 8:
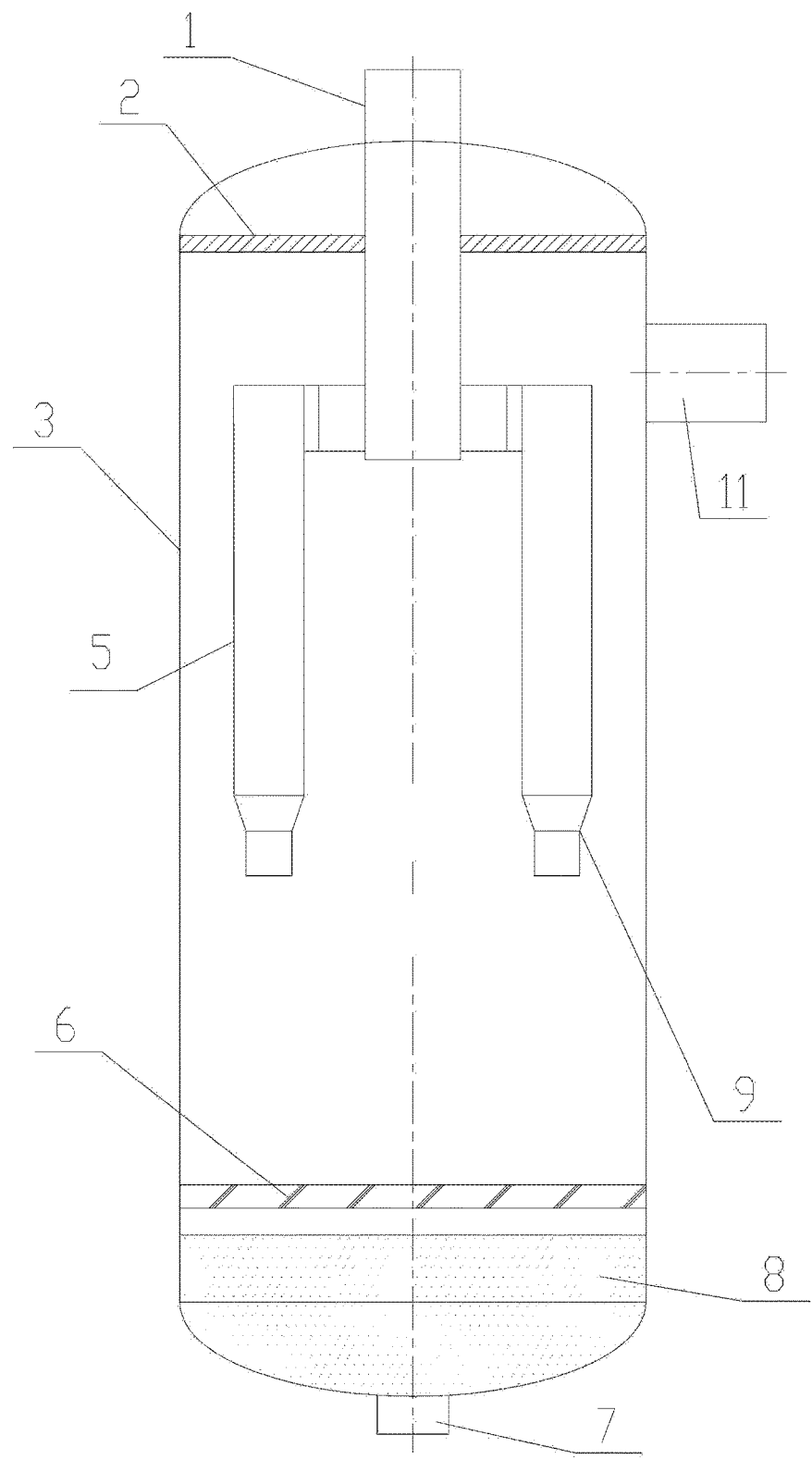
FIG. 8 is a schematic diagram showing structure of a gas-liquid separation device in a fourth implementation of the embodiments of the present disclosure.
Figure 9:
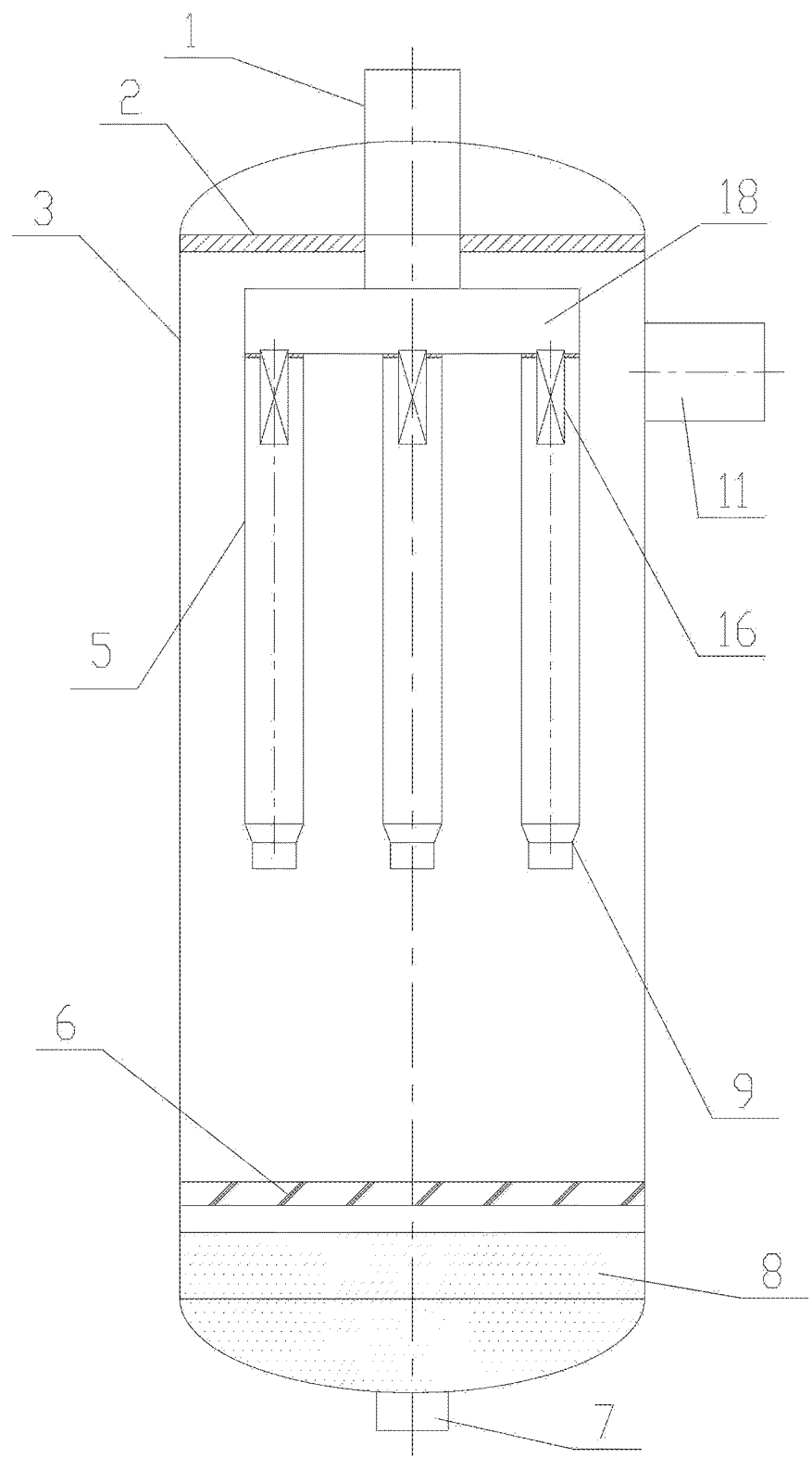
FIG. 9 is a schematic diagram showing structure of a gas-liquid separation device in a fifth implementation of the embodiments of the present disclosure.

In order to reduce the disturbances of the downward gas flow and the upward gas flow in the separation space and improve the separation efficiency, the present disclosure provides a gas-liquid separation device. FIG. 3 is a schematic diagram showing structure of a gas-liquid separation device in a first implementation of the embodiments of the present disclosure, FIG. 4 is a schematic diagram showing structure of a gas-liquid separation device in a second implementation of the embodiments of the present disclosure, FIG. 5 is a schematic diagram showing structure of a gas-liquid separation device in a third implementation of the embodiments of the present disclosure, FIG. 8 is a schematic diagram showing structure of a gas-liquid separation device in a fourth implementation of the embodiments of the present disclosure, and FIG. 9 is a schematic diagram showing structure of a gas-liquid separation device in a fifth implementation of the embodiments of the present disclosure. As illustrated in FIGS. 3 to 5, 8 and 9, the gas-liquid separation device may comprise an outer housing 3 extending vertically, which is provided with a gas outlet 11 at an upper end of the outer housing 3 and a liquid outlet 7 at a lower end of the outer housing 3; an inner housing 5 disposed in the outer housing 3 and extending vertically, an upper end of the inner housing 5 is coupled to the outer housing in a sealed manner 3, a lower end of the inner housing 5 is provided with an opening 9, and an annular space 17 is formed between the outer housing 3 and the inner housing 5; a feeding tube 1 inserted into the outer housing 3 and communicated with the inner housing 5, with a cyclone mechanism 4 between the feeding tube 1 and the inner housing 5 to output fluid in the feeding tube 1 into the inner housing 5 as a swirling flow.

The gas-liquid mixture is input from the feeding tube 1, and output into the inner housing 5 as a swirling flow through the cyclone mechanism 4 between the feeding tube 1 and the inner housing 5. The fluid in the inner housing 5 flows downward as a swirling flow, and the liquid and gas in the fluid are subjected to a gas-liquid separation based on the principle of centrifugal separation after entering the inner housing 5. In the inner housing 5, the separated droplets coalesce into a liquid stream, which flows into the annular space 17 from the lower end of the inner housing 5, then flows to a liquid collection area at the lower end of the outer housing 3 to complete the separation. The liquid can be discharged from the liquid outlet 7 when it reaches a certain level. The gas continues to flow downward from the lower end of the inner housing 5 into the outer housing 3 as a swirling flow. Since the gas has a low density and the gas outlet 11 is disposed at the upper end of the annular space 17, the gas will move upward in a reverse direction through the annular space 17. During the swirling and the upward movement, some droplets entrained in the gas are subjected to a secondary separation under the gravity and the centrifugal force, and finally the purified gas is discharged from the gas outlet 11. That is, the gas and liquid are flowing in 'same-direction' with a downward trend in a vertical direction in the inner housing 5, and then the gas changes from the flow with the downward trend in the vertical direction into a 'reverse' flow with an upward trend in the vertical direction in the annular space 17, thus constituting a new enhanced separation mode combining codirectional and reverse flow provided by the present disclosure.

In this separation method, there is no disturbance by the upward reverse movement of the gas flow in the annular space 17, so the turbulence of the gas flow in the inner housing 5 can be effectively reduced, which is beneficial to the coalescence and separation of the droplets. In the inner housing 5, even if the excessively high gas velocity causes some droplets to break, the droplets will still be discharged from a discharge port at the lower end without being entrained in the upward gas flow. Due to the surface tension, the liquid has a special property, that is, after being merged into the liquid stream, it is difficult for the tiny droplets to be separated therefrom. With this property, the liquid stream that has been separated out by centrifugation can absorb most of the tiny droplets in the vicinity of the outlet at the lower end of the inner housing 5. Before the fluid enters the annular space 17, most of the liquid has been separated out, and a small amount of entrained liquid can also undergo a secondary separation in the annular space 17, thus finally achieving an excellent separation effect. Moreover, the gas-liquid separation device in present disclosure is of a simple structure without any mechanical component, a long service life, and easy installation and maintenance. Compared with other gas-liquid separation devices which can achieve the same purpose, the present disclosure has advantages in structure and operation simplicity.

In addition, since the gas flow in the annular space 17 is not disturbed by the downward reverse movement in the inner housing 5, tangential velocities of the gas and liquid can be increased, thus increasing the centrifugal force and further improving the separation efficiency. Meanwhile, the cross-sectional gas velocity can be greatly increased while maintaining a good separation efficiency, so as to improve the gas flow treatment capacity per unit time.

In order for better understanding, the gas-liquid separation device in the present disclosure will be further explained and described below. As illustrated in FIG. 3, the outer housing 3 of the gas-liquid separation device extends vertically, with a substantially circular cross-section. The upper end of the outer housing 3 may be closed by a sealing plate 2, the lower end of the outer housing 3 is provided with a liquid outlet 7 which is in a closed state generally, and the liquid outlet 7 may be located at a lowest position on the bottom of the outer housing 3. A certain amount of liquid may be stored in the lower end of the outer housing 3, until it reaches a predefined liquid level 8. When the stored liquid exceeds the predefined liquid level 8, the liquid outlet 7 may be opened to discharge the liquid, so that the liquid level is kept at the predefined liquid level 8. The upper end of the outer housing 3 may be provided with a gas outlet 11, which may be located on a sidewall at the upper end of the outer housing 3, to discharge the gas obtained after separation.

As illustrated in FIG. 3, the inner housing 5 of the gas-liquid separation device is disposed in the outer housing 3, and extends vertically. The upper end of the inner housing 5 is coupled to the outer housing in a sealed manner 3. The lower end of the inner housing 5 is provided with an opening 9, and the fluid is discharged from the lower end of the inner housing 5 into the outer housing 3. There is a distance between the lower end of the inner housing 5 and the bottom of the outer housing 3, and an annular space 17 is formed between the outer housing 3 and the inner housing 5. In a feasible implementation, as illustrated in FIGS. 3 and 5, the inner housing 5 may be tapered from top to bottom.

As illustrated in FIG. 3, the feeding tube 1 of the gas-liquid separation device is inserted into the outer housing 3 and communicated with the inner housing 5. The feeding tube 1, which is used for outputting fluid into the inner housing 5, is inserted into the inner housing 5 from above the outer housing 3, and substantially located on an axis of the outer housing 3. In this way, the fluid swirling in the inner housing 5 or in the annular space 17 formed between the outer housing 3 and the inner housing 5 can be prevented from being blocked or disturbed by the feeding tube 1, which is beneficial for improving the gas-liquid separation efficiency.

As illustrated in FIG. 3, there is a cyclone mechanism 4 between the feeding tube 1 and the inner housing 5 to output the fluid in the feeding tube 1 into the inner housing 5 as a swirling flow, so that the fluid flows from top to bottom in the inner housing 5 in a swirling mode. In a feasible implementation, as illustrated in FIG. 3, the lower end of the feeding tube 1 is closed by being installed with a blocking plate 10, and the cyclone mechanism 4 is located on the sidewall of the feeding tube 1. Specifically, the cyclone mechanism 4 is located at the lower end of the sidewall of the feeding tube 1.

The gas-liquid two-phase fluid enters the feeding tube 1, and is blocked at the blocking plate 10, so that some droplets are separated out based on the principle of inertial separation and then coalesce into a liquid stream and enter the inner housing 5 from the cyclone mechanism 4. The fluid, which is composed of the unseparated droplets and gas, also enters the inner housing 5 from the cyclone mechanism 4. The cyclone mechanism 4 outputs the fluid in the feeding tube 1 into the inner housing 5 as a swirling flow. Due to the density difference between the gas and liquid in the fluid, the gas and the liquid are separated based on the principle of centrifugal separation in the swirling process. The liquid that has been separated out flows along an inner wall of the inner housing 5 and enters the outer housing 3 through the lower end of the inner housing 5. Meanwhile, the rest of the fluid flows through the lower end of the inner housing 5 into the outer housing 3 in the same direction as the liquid that has been separated out. Now, the gas-liquid two-phase fluid entering the annular space 17 has changed significantly, i.e., most of the droplets have coalesced into a liquid stream, and the droplets entrained in the fluid are significantly reduced.

Figure 6:
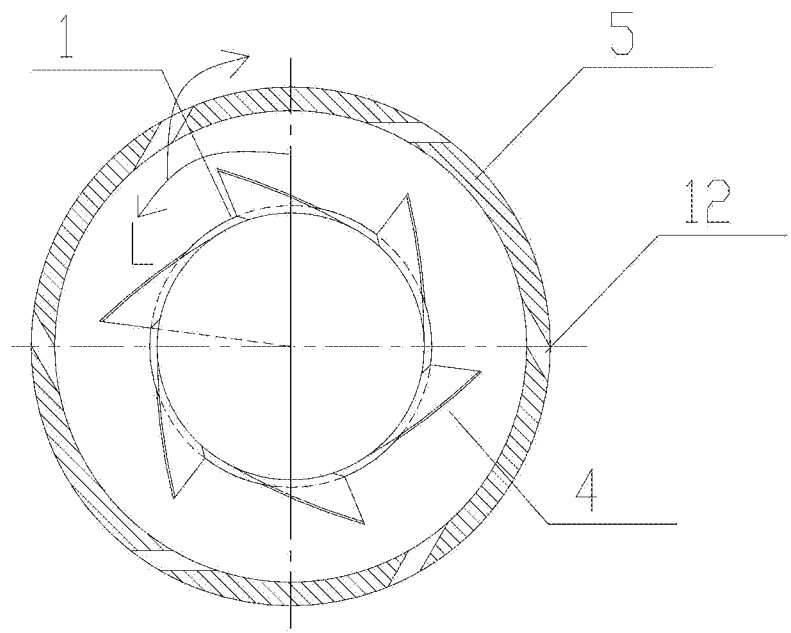
FIG. 6 is a schematic diagram showing structure of a cyclone mechanism and slots on an inner housing in an implementation of the embodiments of the present disclosure.

FIG. 6 is a schematic diagram showing structure of a cyclone mechanism and slots on an inner housing in a feasible implementation of the embodiments of the present disclosure. As illustrated in FIG. 6, the cyclone mechanism 4 may comprise one or more swirl arms which are circumferentially distributed around an axis of the feeding tube 1. Specifically, the swirl arm may be a guide vane protruding outward from the sidewall of the feeding tube 1, and a flow passage facing a non-radial direction is formed between the guide vane and the sidewall of the inner housing 5, so that the fluid output from the cyclone mechanism 4 swirls in a first direction.

Figure 7:
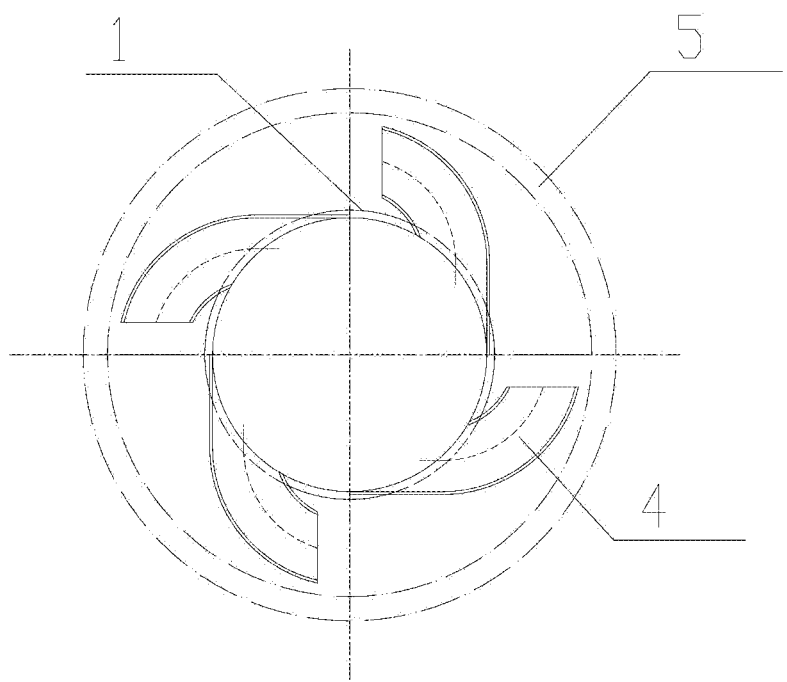
FIG. 7 is a schematic diagram of a cyclone mechanism in another implementation of the embodiments of the present disclosure.

FIG. 7 is a schematic diagram of a cyclone mechanism in another implementation of the embodiments of the present disclosure. As illustrated in FIG. 7, the swirl arm may be an elbow connected to the sidewall of the feeding tube 1. The elbow has a distal end oriented parallel to a tangent line of the feeding tube 1, so that the fluid output from the elbow can swirl in the inner housing 5, avoiding a loss of fluid velocity caused by an excessive impact with a wall surface of the inner housing 5. The orientation of the distal end of the elbow may be horizontal or inclined downward by 0 to 45 degrees, so as to facilitate the downward flow of the swirling fluid.

As illustrated in FIG. 3, in a feasible implementation, the gas-liquid separation device may comprise a grille 6 disposed in the outer housing 3 and located below the inner housing 5. When the gas-liquid separation device separates the gas and liquid, the outer housing 3 has a predefined liquid level 8 lower than the grille 6. Considering that the flows of the gas and liquid are simultaneously discharged from the lower end of the inner housing 5, and the gas may rotationally impact the liquid surface at the bottom of the outer housing 3 due to its higher velocity, therefore the grille 6 is provided, which can block the gas flow impacting downward, reduce the disturbance on the formed liquid surface at the bottom of the outer housing 3 by the gas flow, and increase the gas-liquid separation efficiency. In addition, the grille 6 can also eliminate the swirling flow of the gas, reduce the kinetic energy loss of the gas and decrease the pressure drop. A cross-section of a flow channel of the grille 6 may be a circle, a rectangle or any other shape. The channel may be arranged vertically or inclinedly, and an inclination angle may be 0 to 90 degrees with respect to a horizontal plane. The grille 6 may have a cylindrical structure to match the shape of the outer housing 3. The grille 6 may comprise one or more layers. An opening ratio between 30% and 90% for the grille 6 will achieve a good effect.

In the outer housing 3, the liquid stream formed in the inner housing 5 may pass through the grille 6 to accumulate to reach the predefined liquid level 8 at the bottom of the outer housing 3. The liquid is discharged from the liquid outlet 7 when the predefined liquid level 8 is exceeded. Although the gas discharged from the inner housing 5 moves downward, it is blocked by the grille 6 because of its low density, while the gas outlet 11 is disposed above the annular space 17, so the gas reverses and moves upward in the annular space 17. During the movement, if there are still some droplets entrained in the gas, they will be subjected to a secondary separation under the gravity and the centrifugal force. Finally, the purified gas is discharged from the gas outlet 11, and the droplets undergone secondary separation coalesce into a liquid stream on the inner wall of the outer housing 3, and flow downward to the bottom of the outer housing 3 for accumulation.

The flows of the gas and liquid in the inner housing 5 are in the same direction, and the gas flow in the annular space 17 is reversed. During the codirectional flow, because there is no disturbance from the reverse of the gas flow in the annular space 17, the effects of droplets coalescence and separation are remarkable. Since the gas flow is not affected by the disturbance from the upward or downward reverse movement in the inner housing 5, the tangential velocities of the gas and liquid can be effectively increased, thus increasing the centrifugal force and improving the separation efficiency. Meanwhile, the cross-sectional gas velocity can be greatly increased while maintaining a good separation efficiency, thus increasing the treatment capacity per unit time.

As illustrated in FIG. 4, in a feasible implementation, the grille 6 is located below the inner housing 5. The grille 6 is cone-shaped with an apex facing the inner housing 5. When the gas-liquid separation device separates the gas and liquid, the outer housing 3 has a predefined liquid level 8 lower than the grille 6. In this implementation, a cone angle of the cone-shaped grille 6 is between 20 degrees and 140 degrees. With this structure, the gas discharged downward from the inner housing 5 can be effectively dispersed, which facilitates the reversing of gas flow from downward to upward, while preventing the disturbance and damage to the liquid surface at the bottom caused by excessive impact velocity of the gas flow.

As illustrated in FIGS. 4 and 6, in a feasible implementation, the fluid output from the cyclone mechanism 4 swirls in a first direction. The sidewall of the lower end of the inner housing 5 is provided with a slot 12 horizontally extending in a second direction opposite to the first direction. There may be a plurality of slots 12, which are circumferentially arranged around an axis of the inner housing 5, and which may also be arranged vertically. Of course, the slot 12 may also be shaped as a groove extending vertically. As illustrated in FIG. 4, when entering the inner housing 5 through the cyclone mechanism 4, the gas-liquid two-phase fluid will swirl counterclockwise (in the first direction) due to the cyclone mechanism 4. Since the liquid has a large inertia, it continues moving in the original swirling direction when passing through the slot 12. Since the gas has a small inertia, part of the gas flows in a reverse direction, i.e., flows clockwise (in the second direction), and enters the annular space 17 from the slot 12, which reduces both the entrainment by the gas entering the annular space 17 and the velocity of the gas discharged from the lower end of the inner housing 5. As illustrated in FIGS. 3 and 5, when the inner housing 5 is tapered from top to bottom and a tapered portion of the inner housing 5 is provided with the slot 12, the gas can provide sufficient power to the gas-liquid centrifugal separation due to its strong swirling strength at the beginning after entering the inner housing 5 from the cyclone mechanism 4. However, due to the energy loss in the movement process of the gas, the swirling strength inevitably decreases gradually. Therefore, it is quite advantageous to provide a tapered structure at the lower end of the inner housing 5. In the tapered portion, since the cross-sectional area of the inner housing 5 gradually decreases, the gas is gathered, and its swirling strength is enhanced, thus facilitating the gas-liquid separation. In addition, the total cross-sectional area of the tapered portion at the distal end of the inner housing 5 is small, so the liquid stream that has been separated out and the tiny droplets entrained in the gas can be gathered together, which is more advantageous for the liquid stream to absorb the tiny droplets entrained in the gas, thus achieving the purpose of improving the gas-liquid separation efficiency.

As illustrated in FIG. 4, in a preferred implementation, the lower end of the inner housing 5 is provided with a folded edge 13 located at a circumferential periphery and extending inclinedly downward in a radial outward direction. An angle between the folded edge 13 and the outer wall of the inner housing 5 is 0 to 90 degrees, and the folded edge 13 may have a ring-shaped solid structure or a ring-shaped porous structure. When the gas flow reverses and flows upward, the liquid discharged from the lower end of the inner housing 5 might be entrained upward. On the one hand, the folded edge 13 can make the liquid be easily discharged from the lower end of the inner housing 5, and on the other hand, the folded edge 13 can reduce the interference of the upward gas flow on the liquid stream discharged downward.

As illustrated in FIG. 5, in a feasible implementation, the gas-liquid separation device may comprise an anti-impact baffle 15 disposed in the outer housing 3. The anti-impact baffle 15 is cone-shaped with an apex facing the inner housing 5, and located directly below the inner housing 5. When the gas-liquid separation device separates the gas and liquid, the outer housing 3 has a predefined liquid level 8 higher than the lower end face of the inner housing 5. In this implementation, a cone angle of the cone-shaped anti-impact baffle 15 is between 20 degrees and 140 degrees. The extension of the lower end of the inner housing 5 below the liquid surface can effectively eliminate the influence that the liquid stream discharged from the lower end of the inner housing 5 is entrained by the upward gas flow. The surface tension inside the liquid is large, and thus it is difficult for the tiny droplets to escape from the liquid stream after being merged into the liquid stream, so that the liquid collection efficiency can be greatly improved. The purpose of the anti-impact baffle 15 is to ensure that the liquid below the anti-impact baffle 15 is substantially not disturbed by the gas flow, so that the liquid can be discharged stably from the liquid outlet 7 without entraining gas. The cone-shaped anti-impact baffle 15 can effectively disperse the downward impact gas flow, decrease the axial velocity of the downward gas flow, and reduce the impact of the gas flow on the interior of the liquid, while reversing the gas flow so that the gas flow below the liquid surface can move upward quickly to be discharged.

As illustrated in FIG. 5, in a feasible implementation, a filling structure 14 is disposed in the annular space 17. The filling structure 14 may have a cylindrical or conical structure, and the filling material may include a silk screen, a ceramic ring, etc. The function of the filling structure 14 is to further purify the upward gas flow, because a small amount of liquid may be entrained therein, and the filling structure 14 can further separate out the liquid, thus increasing the separation efficiency.

In the above implementations, the cross-section of the outer housing 3 is circular, and the cross-section of the inner housing 5 is also circular. In a feasible implementation, a diameter of outer housing 3 is denoted as D, a ratio of a diameter of the inner housing 5 to the diameter of the outer housing 3 is between 0.5 and 0.8, a ratio of a length of the outer housing 3 to the diameter of the outer housing 3 is between 1 and 3, and a ratio of a length of the inner housing 5 to the diameter of the inner housing 5 is between 1 and 3. A ratio of a diameter of the lower end of the inner housing 5 to the diameter of the outer housing 3 is between 0.2 and 0.8. The cross-section of the feeding tube 1 is circular, a ratio of a cross-sectional area of the feeding tube 1 to a cross-sectional area of the inner housing 5 is between 0.2 and 0.7, and a ratio of a total cross-sectional area of the outlet of the cyclone mechanism 4 to the cross-sectional area of the inner housing 5 is between 0.1 and 0.6. When the diameter D of the outer housing 3 is 0.5 m to 8.0 m, an average gas velocity at the cross-section of the inner housing 5 is 1.8 m/s to 8.0 m/s. Through the simulation calculation, it is found that when the parameters of the components of the gas-liquid separation device in the present disclosure are within the above ranges, the gas-liquid separation device can be kept in a range of good separation efficiency.

The present application further discloses a gas-liquid separation device, which can be applied to the tangential-flow type gas-liquid separation device. As illustrated in FIG. 8, the difference is that the feeding tube 1 is disposed relative to the inner housing 5 in a different way. In this embodiment, there are a plurality of inner housings 5 which are circumferentially distributed around the feeding tube 1. The feeding tube 1 is inserted into the outer housing 3 from above, and a plurality of outlets on the wall of the feeding tube 1 are coupled to the sidewall of the upper end of the inner housing 5, so that the fluid output from the feeding tube 1 flows into the inner housing 5 tangentially. The gas-liquid two-phase fluid flows in the same direction in the inner housing 5, and the gas flow reverses in the annular space 17. When distributing the gas-liquid two-phase fluid from the feeding tube 1 into each of the inner housings 5, the existing conventional distribution technology can be adopted. With this structure, the cross-sectional gas velocity can be greatly increased while maintaining a good separation efficiency, thus increasing the treatment capacity per unit time.

The present application further discloses a gas-liquid separation device, which can be applied to an axial-flow type gas-liquid separation device. As illustrated in FIG. 9, the difference lies in the way in which the gas-liquid two-phase fluid enters the inner housing 5. In this embodiment, there are a plurality of inner housings 5, and the feeding tube 1 is inserted into the outer housing 3 from above. The upper end of the inner housing 5 is coupled to the feeding tube 1 through a distributor 18, and a spiral guide vane mechanism 16 is disposed between the inner housing 5 and the distributor 18 for guiding the fluid output from the distributor 18 into the inner housing 5 as a swirling flow. When distributing the gas-liquid two-phase fluid from the feeding tube 1 into each of the inner housings 5, the existing conventional distribution technology can be adopted. With this structure, the cross-sectional gas velocity can be greatly increased while maintaining a good separation efficiency, thus increasing the treatment capacity per unit time.

The above gas-liquid separation device adopting the new enhanced separation mode combining codirectional and reverse flow provided in the present disclosure can be modified from the tangential-flow and reverse type cyclone separator and the axial-flow type cyclone separator in the existing technology. The gas outlets of the existing tangential-flow and reverse type cyclone separator and the axial-flow type cyclone separator are modified into the feeding tubes, and the gas inlets are modified into the gas outlets, and then corresponding components such as the inner housing and/or distributor are installed, thus the modification of the existing cyclone separator is achieved and the device upgrading cost is effectively reduced.

All literatures and references disclosed, including patent applications and publications, are incorporated herein by reference for all purposes. The phrase 'substantially composed of . . . ' describing a combination should include the determined elements, compositions, components or steps, and any other element, composition, component, or step which substantively does not affect the basic novel features of the combination. When the term 'comprise' or 'include' is used to describe the combination of elements, compositions, components or steps here, embodiments substantially consisting of the elements, compositions, components or steps are also contemplated. Here the term 'may' is used to indicate that any described attribute preceded by this term is optional. Multiple elements, compositions, components, or steps can be provided by a single integrated element, composition, component or step. Alternatively, a single integrated element, composition, component or step may be divided into multiple separate elements, compositions, components or steps. The disclosure 'a' or 'an' used to describe the elements, compositions, components or steps is not intended to exclude other elements, compositions, components or steps.

The embodiments in the present disclosure are described in a progressive manner, which means descriptions of each embodiment are focused on the differences from other embodiments, and the descriptions of the same or similar aspects of the embodiments are applicable to each other. The above embodiments are only used to describe the technical ideas and characteristics of the present disclosure, and the purpose is to allow a person skilled in the art to understand the contents of the present disclosure and implement them accordingly, rather than limiting the protection scope of the present disclosure. Any equivalent change or modification made according to the spirit essence of the present disclosure shall fall within the protection scope of the present disclosure.

What is claimed is:

1. A gas-liquid separation device, comprising:
    an outer housing extending vertically, which is provided with a gas outlet at an upper end of the outer housing and a liquid outlet at a lower end of the outer housing;
    an inner housing disposed in the outer housing and extending vertically, an upper end of the inner housing being coupled to the outer housing in a sealed manner, a lower end of the inner housing being opened, with an annular space formed between the outer housing and the inner housing; and
    a feeding tube inserted into the outer housing and communicated with the inner housing, with a cyclone mechanism provided between the feeding tube and the inner housing for outputting fluid in the feeding tube into the inner housing as a swirling flow;

wherein the fluid flows downward in a vertical direction in the inner housing and then upward in the vertical direction in the annular space;

wherein the cyclone mechanism comprises one or more swirl arms which are circumferentially distributed around an axis of the feeding tube, and the one or more swirl arms are guide vanes protruding outward from a sidewall of the feeding tube, and a flow passage facing a non-radial direction is formed between the guide vane and the sidewall of the inner housing.

2. The gas-liquid separation device according to claim 1, wherein the feeding tube is inserted into the inner housing from above the outer housing, a lower end of the feeding tube is closed, and the cyclone mechanism is located on a sidewall of the feeding tube.

3. The gas-liquid separation device according to claim 1, wherein a cross-section of the outer housing is circular, and a cross-section of the inner housing is circular.

4. The gas-liquid separation device according to claim 3, wherein a ratio of a diameter of the inner housing to a diameter of the outer housing is between 0.5 and 0.8.

5. The gas-liquid separation device according to claim 3, wherein a ratio of a length of the outer housing to a diameter of the outer housing is between 1 and 3.

6. The gas-liquid separation device according to claim 3, wherein a ratio of a length of the inner housing to a diameter of the inner housing is between 1 and 3.

7. The gas-liquid separation device according to claim 3, wherein when a diameter D of the outer housing is 0.5 m to 8.0 m, an average gas velocity at the cross-section of the inner housing is 1.8 m/s to 8.0 m/s.

8. The gas-liquid separation device according to claim 1, further comprising a grille disposed in the outer housing and located below the inner housing, wherein the grille is cone-shaped with an apex facing the inner housing; and wherein during gas-liquid separation, the outer housing has a predefined liquid level lower than the grille.

9. The gas-liquid separation device according to claim 1, further comprising a grille disposed in the outer housing and located below the inner housing, wherein the grille is cylindrical; and wherein during gas-liquid separation, the outer housing has a predefined liquid level lower than the grille.

10. The gas-liquid separation device according to claim 1, wherein the fluid output from the cyclone mechanism swirls in a first direction; and wherein a sidewall of the lower end of the inner housing is provided with a slot horizontally extending in a second direction opposite to the first direction.

11. The gas-liquid separation device according to claim 10, wherein the lower end of the inner housing is provided with a folded edge located at a circumferential periphery and extending inclinedly downward in a radial outward direction.

12. The gas-liquid separation device according to claim 1, further comprising an anti-impact baffle disposed in the outer housing, wherein the anti-impact baffle is cone-shaped with an apex facing the inner housing, and located directly below the inner housing; and wherein during gas-liquid separation, the outer housing has a predefined liquid level higher than a lower end face of the inner housing.

13. The gas-liquid separation device according to claim 1, wherein the inner housing is tapered from top to bottom.

14. The gas-liquid separation device according to claim 1, wherein the gas-liquid separation device comprises a plurality of inner housings which are circumferentially distributed around the feeding tube; and wherein the feeding tube is inserted into the outer housing from above, and the fluid output from the feeding tube flows into the inner housings tangentially.

15. The gas-liquid separation device according to claim 1, wherein the gas-liquid separation device comprises a plurality of inner housings, the feeding tube is inserted into the outer housing from above, the upper ends of the inner housings are coupled to the feeding tube through a distributor, and a spiral guide vane mechanism is disposed between each of the inner housings and the distributor for guiding fluid output from the distributor into the inner housings as a swirling flow.

16. A gas-liquid separation device, comprising:
an outer housing extending vertically, which is provided with a gas outlet at an upper end of the outer housing and a liquid outlet at a lower end of the outer housing;
an inner housing disposed in the outer housing and extending vertically, an upper end of the inner housing being coupled to the outer housing in a sealed manner, a lower end of the inner housing being opened, with an annular space formed between the outer housing and the inner housing; and
a feeding tube inserted into the outer housing and communicated with the inner housing, with a cyclone mechanism provided between the feeding tube and the inner housing for outputting fluid in the feeding tube into the inner housing as a swirling flow;
wherein the fluid flows downward in a vertical direction in the inner housing and then upward in the vertical direction in the annular space;
wherein the cyclone mechanism comprises one or more swirl arms which are circumferentially distributed around an axis of the feeding tube, and the one or more swirl arms are elbows connected to a sidewall of the feeding tube, and the elbow has a distal end oriented parallel to a tangent line of the feeding tube.

17. The gas-liquid separation device according to claim 16, wherein the feeding tube is inserted into the inner housing from above the outer housing, a lower end of the feeding tube is closed, and the cyclone mechanism is located on a sidewall of the feeding tube.

18. The gas-liquid separation device according to claim 16, wherein a cross-section of the outer housing is circular, and a cross-section of the inner housing is circular.

19. The gas-liquid separation device according to claim 18, wherein a ratio of a diameter of the inner housing to a diameter of the outer housing is between 0.5 and 0.8.

20. The gas-liquid separation device according to claim 18, wherein a ratio of a length of the outer housing to a diameter of the outer housing is between 1 and 3.

* * * * *